(12) United States Patent
Icart et al.

(10) Patent No.: US 8,824,670 B2
(45) Date of Patent: Sep. 2, 2014

(54) CRYPTOGRAPHY BY PARAMETERIZING ON ELLIPTIC CURVE

(75) Inventors: Thomas Icart, Paris (FR); Herve Chabanne, Paris (FR)

(73) Assignee: Morpho, Paris (FR)

( * ) Notice: Subject to any disclaimer, the term of this patent is extended or adjusted under 35 U.S.C. 154(b) by 0 days.

(21) Appl. No.: 13/378,329

(22) PCT Filed: Jun. 28, 2010

(86) PCT No.: PCT/FR2010/051339
§ 371 (c)(1),
(2), (4) Date: Dec. 14, 2011

(87) PCT Pub. No.: WO2011/001093
PCT Pub. Date: Jan. 6, 2011

(65) Prior Publication Data
US 2012/0134493 A1    May 31, 2012

(30) Foreign Application Priority Data
Jun. 30, 2009    (FR) ...................................... 09 54473

(51) Int. Cl.
*G06F 21/00* (2013.01)
*H04L 9/00* (2006.01)
*H04L 9/30* (2006.01)
*H04L 9/08* (2006.01)

(52) U.S. Cl.
CPC .............. *H04L 9/3066* (2013.01); *H04L 9/005* (2013.01); *H04L 2209/08* (2013.01); *H04L 9/0844* (2013.01)
USPC ................ 380/28; 380/30; 380/44; 380/278; 380/282

(58) Field of Classification Search
USPC ........................................................... 380/28
See application file for complete search history.

(56) References Cited

U.S. PATENT DOCUMENTS 6,212,279 B1 *  4/2001  Reiter et al. ................... 380/278
6,243,467 B1 *  6/2001  Reiter et al. ..................... 380/30

(Continued)

FOREIGN PATENT DOCUMENTS

WO    WO-2010081980 A1    7/2010

OTHER PUBLICATIONS

Thomas Icart et al: "How to Hash into Elliptic Curves", May 20, 2009.*

(Continued)

*Primary Examiner* — Kambiz Zand
*Assistant Examiner* — Yonas Bayou
(74) *Attorney, Agent, or Firm* — Gardere Wynne Sewell LLP; Andre M. Szuwalski (57) ABSTRACT

A device is controlled by a controller on the basis of a password. A determination is made at the device or at the controller, on the basis of a random value r1, of a point P(X,Y) on an elliptic curve in a finite body $F_q$, q being an integer, according to: $E_{a,b}(x, y):x^3+ax+b=y^2$. First and second parameters k and k' are obtained such that P(X,Y)=F(K,k'), where F is a surjective function of $F_q \times F_q$ in $F_q$. The first and second parameters are obtained in an encrypted format by encryption in accordance with the password. The first and second encrypted parameters are then transmitted to the controller. During the control, the function F is used, such that, whatever the values of z and z' which are input elements of $F_q$, F(z,z') is a point on the elliptic curve and the input elements do not satisfy the equation.

12 Claims, 3 Drawing Sheets

(56) References Cited

U.S. PATENT DOCUMENTS

| | | | | |
|---|---|---|---|---|
| 7,062,043 | B1* | 6/2006 | Solinas | 380/30 |
| 7,062,044 | B1* | 6/2006 | Solinas | 380/30 |
| 7,970,134 | B2* | 6/2011 | Yi et al. | 380/44 |
| 2003/0235300 | A1* | 12/2003 | Solinas | 380/30 |
| 2004/0119614 | A1* | 6/2004 | Joye | 341/50 |
| 2008/0226083 | A1* | 9/2008 | Yi et al. | 380/282 |

OTHER PUBLICATIONS

Julien: http://eprint.iacr.org/2009/468.pdf; Sep. 23, 2009.*
Thomas: http://eprint.iacr.org/2009/226.pdf; May 24, 2009.*
Markus Ullmann et al: "Password Authenticated Key Agreement for. Contactless Smart Cards", Internet Citation, Jan. 1, 2008, XP007913186.*
International Search Report and Written Opinion for PCT/FR2010/051339 mailed Nov. 18, 2010 (14 pages).
Markus Ullmann et al: "Password Authenticated Key Agreement for Contactless Smart Cards," Internet Citation, Jan. 1, 2008, http://events.iaik.tugraz.at/RFIDSec08/Papers/Publication/14%20-%20Ullmann%20-%20PW%20Authenticated%20Key%20Agreement%20-%20Paper.pdf (22 pages).
Barreto Paulo S L M et al: "Fast Hashing Onto Elliptic Curves Over Fields of Characterisitic 3," Internet citation, Nov. 15, 2001, pp. 1-11, http://eprint.iacr.org/2001/098.pdf.
Maciej Ulas: "Rational Points on Certain Hyperelliptic Curves over Finite Fields," published Jun. 11, 2007, pp. 1-9.
Coron, Jean Sebastien and Icart, Thomas: "A Random Oracle into Elliptic Curves," dated Jul. 10, 2009 (14 pages).

* cited by examiner

CRYPTOGRAPHY BY PARAMETERIZING ON ELLIPTIC CURVE

PRIORITY CLAIM

This application is a 371 filing from PCT/FR2010/051339 filed Jun. 28, 2010 which claims the benefit of French Application for Patent No. 0954473 filed Jun. 30, 2009, the disclosures of which are hereby incorporated by reference.

TECHNICAL FIELD

The present invention relates to message cryptography based on the use of points on an elliptic curve, and more particularly said use in the field of algorithms of the EKE (Encrypted Key Exchange) type.

BACKGROUND

Figure 1:
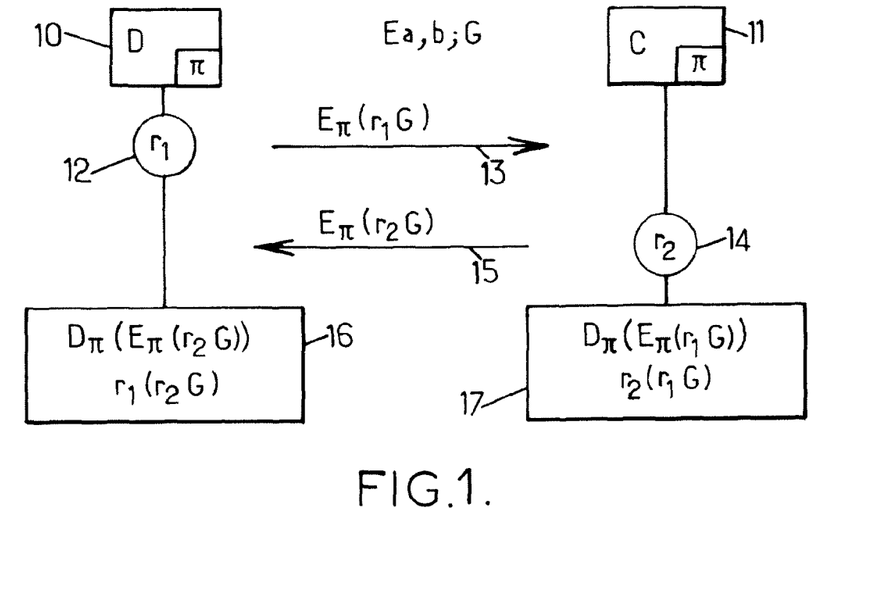
FIG. 1, already described, illustrates the main steps of a method of control according to the prior art.

Methods of authentication by password are based on the use of an algorithm of the EKE type. This type of algorithm is illustrated in FIG. 1.

A device D 10 wishes to be authenticated on the basis of a password $\pi$ at a controller C 11. Each of these entities knows the password $\pi$. Moreover, let us consider an elliptic curve $E_{a,b}$, and a generator G of the set of points on the elliptic curve, as public parameters. The elliptic curve satisfies the following equation:

$$E_{a,b}(x,y):x^3+ax+b=y^2 \qquad (1)$$

At a step 12, the device D 10 generates a random number $r_1$. Then, it transmits this random number in the form of a point on the elliptic curve to the controller 11. For this purpose, it determines a value V to be transmitted satisfying:

$$V=r_1 \cdot G$$

This result is then encrypted with the password in the form $E_\pi(r_1 \cdot G)$, $E_\pi$ being an encryption function by password.

Then, the device sends a message 13 to the controller stating the value $E_\pi(r_1 \cdot G)$.

On receiving the message 13, in its turn the controller 11 generates a random value $r_2$ at a step 14. Then it transmits this value in the form of a point on the elliptic curve, and transmits a message 15 to the device 10 stating the result:

$$E_\pi(r_2 \cdot G)$$

Following this exchange of random values $r_1$ and $r_2$ in encrypted form, the device 10 recovers at a step 16 the random value $r_2$ generated by the controller by deciphering, using a decryption function with password $D_\pi$, the information contained in the message 15:

$$r_2 \cdot G = D_\pi E_\pi(r_2 \cdot G)$$

and the controller 11 recovers at a step 17 the random value $r_1$ generated by the device 10 by deciphering the information contained in the message 13:

$$r_1 \cdot G = D_\pi E_\pi(r_1 \cdot G)$$

Thus, following a protected exchange, each entity is able to calculate a common key K:

$$K=r_1 \cdot r_2 \cdot G$$

This type of algorithm aims to exchange values in a form encrypted with a password or a key derived from a password. However, it should be noted that according to a classical representation of an elliptic curve satisfying equation (1) on a finite field $F_q$, the exchanges described with reference to FIG. 1 can allow a potential attacker to deduce information relating to the password $\pi$. In fact, exchanging random values in an encrypted form as described above, via the two messages 13 and 15, supplies a redundancy of information which may allow the secret of the password to be broken. More precisely, at each listening-in, an attacker could test a password to decipher the information exchanged in messages 13 and 15. He is then presented with two cases. In the first case, the decrypted information corresponds to a point on the curve and accordingly the password is correct. In the second case, the decrypted information does not correspond to a point on the elliptic curve and the password is not discovered. By multiplying the listenings-in and the separate passwords, it is thus possible to find the password belonging to a finite set of elements.

The present invention aims to improve the situation.

SUMMARY

A first aspect of the present invention proposes a method of controlling a device by a controller on the basis of a password; said method comprising the following steps, at the device or at the controller:

/1/ on the basis of a random value $r_1$, determine a point P(X,Y) on an elliptic curve, in a finite field $F_q$, q being an integer, of equation:

$$E_{a,b}(x,y):x^3+ax+b=y^2 \qquad (1)$$

/2/ obtain first and second parameters k and k', such that $$P=F(k,k')$$

where F is a surjective function of $F_q \times F_q$, in $F_q$

/3/ obtain the first and second parameters in encrypted form by encryption as a function of the password; and /4/ transmit said first and second encrypted parameters to the controller;

in which the function F is such that, regardless of z and z' input elements of $F_q$, F(z,z') is a point on the elliptic curve, and the input elements do not satisfy equation (1).

Owing to these arrangements, it is possible to avoid the attacks such as described above with respect to the prior art. In fact, under these conditions it is no longer possible to test a password by determining whether the result obtained corresponds to a point (X,Y) on the elliptic curve $E_{a,b}$ since the function F always supplies a point on the elliptic curve as output regardless of the parameters that were supplied as input, as the input parameters do not satisfy the classical equation of an elliptic curve. Ingeniously, it therefore envisages representing a point on the elliptic curve in a different way, using this surjective function F, so as not to supply any information to a potential attacker that can enable him to deduce the password used.

In order to determine said function F allowing a point P(X,Y) on an elliptic curve to be represented according to some other parameterization than that of equation (1), it is possible to use as a basis an invertible function $f_{a,b}$, the inverse function $f_{a,b}^{-1}$ of which makes it possible to recover a point on the curve, according to two parameters that do not satisfy equation (1), from an input parameter.

The function F can be written:

$$F(k,k')=f'(k')+f_{a,b}(k)$$

where $f_{a,b}$ is an invertible function, based on the coefficients a and b of the elliptic curve, taking an input parameter and supplying a point on the elliptic curve and where f' is a function generating a point on the elliptic curve as a function of a parameter; and where, at step /2/, the parameters k and k' are obtained by the following steps:
  randomly generate a value of the parameter k';
  calculate a value of f'(k');
  determine a value of the parameter k from the following equation:

$$k = f_{a,b}^{-1}(P(X,Y) - f'(k'))$$

Advantageously, by combining a function f' that makes it possible to generate a point on the elliptic curve on the basis of a parameter k' of random value and an invertible function $f_{a,b}$ based on the coefficients of the elliptic curve a and b, it is then possible to obtain a function F that allows parameterization of a point on the curve while avoiding the attacks described.

The function f' can in particular be written:

$$f'(k') = k' \cdot G$$

where G is the generator of the set of points on the elliptic curve; and a value of the parameter k is determined from the following equation:

$$k = f_{a,b}^{-1}(P(X,Y) - k' \cdot G)$$

Under these conditions, the function F can be written:

$$F(k,k') = f_{a,b}(k) + k' \cdot G$$

Alternatively, the function f' can be written:

$$f'(k') = f_{a,b}(k')$$

and
a value of the parameter k is determined from the following equation:

$$k = f_{a,b}^{-1}(P(X,Y) - f_{a,b}(k'))$$

Under these conditions, the function F can be written as follows:

$$F(k,k') = f_{a,b}(k) + f_{a,b}(k')$$

Thus, generally, for parameterizing a point P(X,Y) on the curve according to the present invention, a first step envisages obtaining a point on the curve for a value of the parameter k'. Then a point on the curve is determined which corresponds to the subtraction of the point P(X,Y) to be represented and of the point obtained at the first step. Then another point on the elliptic curve is obtained. Next, the inverse function of $f_{a,b}$ is applied to this point and a value of parameter k is obtained. The point P is then represented in the form of the pair of parameters k and k' that does not satisfy equation (1).

In one embodiment of the present invention, the function F comprises at least one invertible function $f_{a,b}$, such that $$\forall P = (X,Y) \in E_{a,b}, |f_{a,b}^{-1}(X,Y)| < L$$

where L is an integer having a relatively small value in relation to the number of points on the elliptic curve (1).

The fact that function F comprises a function $f_{a,b}$ means that application of the function F to first and second parameters corresponds to applying this function $f_{a,b}$ to at least one of the first and second parameters. We can thus envisage, on the one hand, generating a point on the curve on the basis of the first parameter and, on the other hand, applying the inverse function of $f_{a,b}$ to obtain the second parameter. By following this procedure, a point on the elliptic curve can be represented according to these two parameters.

Thus, application of the function F to first and second parameters can correspond to application, to at least one of the two parameters, of a function $f_{a,b}$ such that $$\forall P(X,Y) \in E_{a,b}, |f_{a,b}^{-1}(X,Y)| < L \tag{4}$$

where L is an integer having a relatively small value in relation to the number of points on the elliptic curve (1).

In other words, the function $f_{a,b}$ considered here has a pre-image corresponding to a set of points P on the elliptic curve $E_{a,b}$ bounded by a quite small maximum value relative to the number of points on the elliptic curve. In fact, if this is not so, it is then possible to invert the function $f_{a,b}$ simply by taking a number at random. In this context, it can for example be considered that L is smaller than $1/2^{80}$ times the number of points on the curve.

By using an invertible function satisfying conditions (4), it is easy to obtain a function F for representing a point on the curve via parameters k and k' which do not permit an attack on the password used for encrypting them, such as that described above.

In one embodiment of the present invention, the function $f_{a,b}$ makes a pair of parameters (x, y) correspond to a parameter u such that x is the only solution of the following equation:

$$x^3 + ax + b - (ux + Q(u,a,b))^2 = 0 \tag{5}$$

and y satisfies:

$$y = u \cdot x + Q(u,a,b)$$

This equation (5) is obtained by replacing y in equation (1) by the term ux+Q(u,a,b). The term Q(u,a,b) denotes a rational fraction in the variables u, a and b.

The fact that this equation (5) only allows a single root is equivalent to the fact that the discriminant denoted Δ(u,a,b) of the following term is not a square whatever the parameter u:

$$x^3 + ax + b - (ux + Q(u,a,b))^2$$

For q=2 mod 3, we can write:

$$\Delta(u,a,b) = -3R(u,a,b)^2$$

where R is a rational fraction.

In fact, for p=2 mod 3, −3 is not a square and therefore $-3R(u,a,b)^2$ is never a squared term.

Since equation (5) only allows a single root then the following term is a polynomial of degree 1:

$$gcd(x^3 + ax + b - (ux + Q(u,a,b))^2, X^p - X)$$

where gcd is a large common denominator.

The root of this polynomial, denoted $X_P$, is an abscissa of a point on the elliptic curve. Finally, the point with abscissa $X_P$ and ordinate $u \cdot X_P + Q(u,a,b)$ is a point on the curve.

In one example, a rational fraction Q(u,a,b) that satisfies the following equation can be taken into consideration:

$$Q(u, a, b) = \frac{236196 u^2 ab + 405 u^8 a - 20412 u^6 b - 45927 u^4 a^2 - u^{12} + 19683 a^3}{54 u(-162 a u^4 + 2187 a^2 - u^8 + 2916 b u^2)}$$

In one embodiment, the function $f_{a,b}$ can advantageously be defined as follows in $F_q$, q being equal to 2 mod 3. It makes a pair of parameters (x, y) correspond to a parameter u, such that:

$$x = (v^2 - b - u^6/27)^{1/3} + u^2/3$$

and $$y = u \cdot x + v$$

-continued with $$v = \frac{3a - u^4}{6u} = Q(u, a, b)$$

and with $$f_{a,b}(0) = 0.$$

Such a function is invertible. Thus, for a P(X,Y) on the elliptic curve, a pre-image of the point by the function $f_{a,b}$ is a solution of the following equation:

$$u^4 - 6u^2 x + 6uy - 3a = 0$$

Now, a polynomial equation of this kind can easily be inverted.

Moreover, the set of pre-image points P of this function $f_{a,b}$ is bounded by L that is small relative to the number of points on the elliptic curve.

Thus, this function satisfies the characteristics defined previously.

We can also envisage basing the function F on the use of a function $f_{a,b}$ defined on the basis of polynomials satisfying Skalba's equation.

It should be noted that polynomials satisfying Skalba's equality are defined in the document 'Rational points on certain hyperelliptic curves over finite fields' by Maciej Ulas, published 11 Jun. 2007. These functions are invertible. In fact, given polynomials $X_1(k)$, $X_2(k)$, $X_3(k)$ and $U(k)$ satisfying Skalba's equality, i.e. satisfying:

$$f(X_1(k)) \cdot f(X_2(k)) \cdot f(X_3(k)) = U(k)^2$$

where f is the polynomial that defines the elliptic curve $E_{a,b}$.

More precisely, f satisfies the equation:

$$f(x) = y^2$$

where x and y are elements of $F_q^2$, and the pair (x,y) represents a point on $E_{a,b}$.

$f_{a,b}(k)$ is defined as being the point $P = (X_i(k), f(X_i(k))^{1/2})$, where i is such that $f(X_i(k))$ is a square in $F_q$. Thus, to invert this function $f_{a,b}$, given a point $P = (X,Y)$, we calculate the solutions $k_s$ of the three polynomial equations:

$$X_1(k_s) - X = 0$$

$$X_2(k_s) - X = 0$$

$$X_3(k_s) - X = 0$$

Each of these solutions is a pre-image of P by $f_{a,b}$.

In the case where F(k,k') is written:

$$F(k,k') = f_{a,b}(k) + f_{a,b}(k')$$

We can advantageously obtain a uniform distribution of the points, output values of $f_{a,b}$, for a uniform distribution of input values. In this case, if the input values are randomly determined, then the output values also have a random distribution.

By following this procedure, it is possible to avoid attacks based on a statistical analysis of values used for the parameter, which could supply information. In fact, in the case where the inverse of this function $f_{a,b}$ on a point P on the elliptic curve corresponds to a plurality of values of the input parameter of this inverse function, it is possible that some of these values recur more often than others according to a statistical law. Thus, if the attacker knows this statistical law, by testing a password on the information exchanged, he can decide whether or not the values of the parameter exchanged follow this law. He can thus deduce from this whether the password tested is correct or not.

In order to avoid this type of attack, it can be advantageous to employ an algorithm such as that described below.

$D_i$ denotes the set of points on the elliptic curve $E_{a,b}$ which has exactly a number i of pre-images by the function $f_{a,b}$. In the example described below, five sets are defined: $D_1$, $D_2$, $D_3$, $D_4$ and $D_5$.

GEN denotes a function that generates, randomly and uniformly distributed, points on the elliptic curve. Let $$\delta_i = \frac{i}{L},$$

a probability associated with the set $D_i$.

For t=0 at T−1, where T is an integer
generate a point $P_t$ with the function GEN;
if $P_t$ is an element of D0, then go to the start;
If Pt is an element of Di
   Select at random a value b between 0 and 1 satisfying:

$$Pr(b=0) = \delta_i$$

If b is equal to 1, then go to step (1);
   Otherwise
select at random an element u in the set $f_{a,b}^{-1}(P_t)$
return u It should be noted that, to obtain a $1\frac{1}{2}^k$ probability of success, it is sufficient to have T equal to a polynomial evaluated in k of degree 1, in other words T is a multiple of k.

Moreover, the following steps can be employed:
receive a message stating first and second parameters in a form encrypted with the password;
decipher the first and second parameters and obtain parameters p and p'; and
calculate a common secret value K with the controller according to the following equation:

$$K = r_1 \cdot F(p, p')$$

where $r_1$ is the random value used at step /1/.

Thus, the device and the controller can finally have a common key at their disposal without exchanging information that puts the secrecy of the password in jeopardy.

A second aspect of the present invention proposes an electronic entity comprising means suitable for implementing a method of control according to the first aspect of the present invention.

A third aspect of the present invention proposes a system of control by password comprising a first electronic entity according to the second aspect as controller and a second electronic entity according to the second aspect as device to be controlled.

BRIEF DESCRIPTION OF THE DRAWINGS

Other aspects, aims and advantages of the invention will become clear on reading the description of one of its embodiments.

The invention will also be better understood with the aid of the following figures.

DETAILED DESCRIPTION OF THE DRAWINGS

Figure 2:
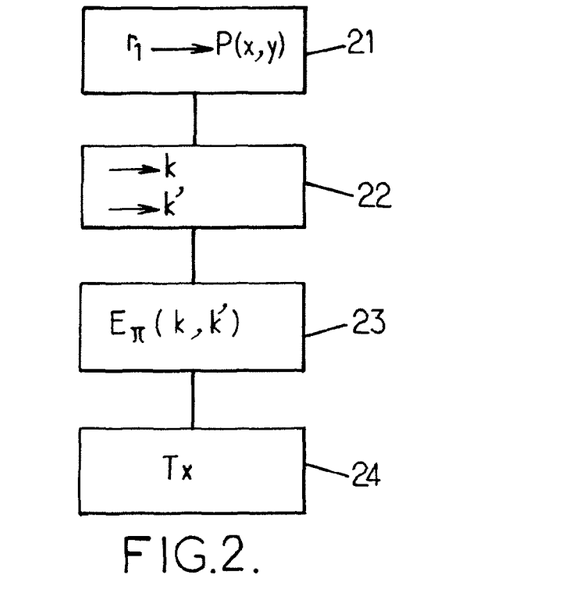
FIG. 2 shows the main steps of a method of control according to one embodiment of the present invention.

FIG. 2 illustrates the main steps of a method of control according to one embodiment of the present invention.

At a step 21, a point P=(X,Y) on an elliptic curve in a finite field $F_q$, with q an integer, is determined on the basis of a random value $r_1$. Then, at a step 22, first and second parameters k and k' are obtained, such that $$P=F(k,k')$$

where F is a surjective function such as of $F_q \times F_{q'}$ in $F_q$.

The parameters thus obtained make it possible to represent the point P ingeniously so as to protect the secrecy of the password during exchanges between the device and the controller.

At a step 23, the first and second parameters are obtained in encrypted form by encryption as a function of the password $\pi E_\pi(k,k')$.

In this ingenious form, the random value $r_1$ can advantageously be transmitted, at a step 24, from the device to be controlled to the controller, or from the controller to the device to be controlled so as to generate a secret common key.

The function F is such that, whatever z and z' element of $F_q$, F(z,z') is a point on the elliptical curve and the elements z and z' do not satisfy equation (1).

Figure 3:
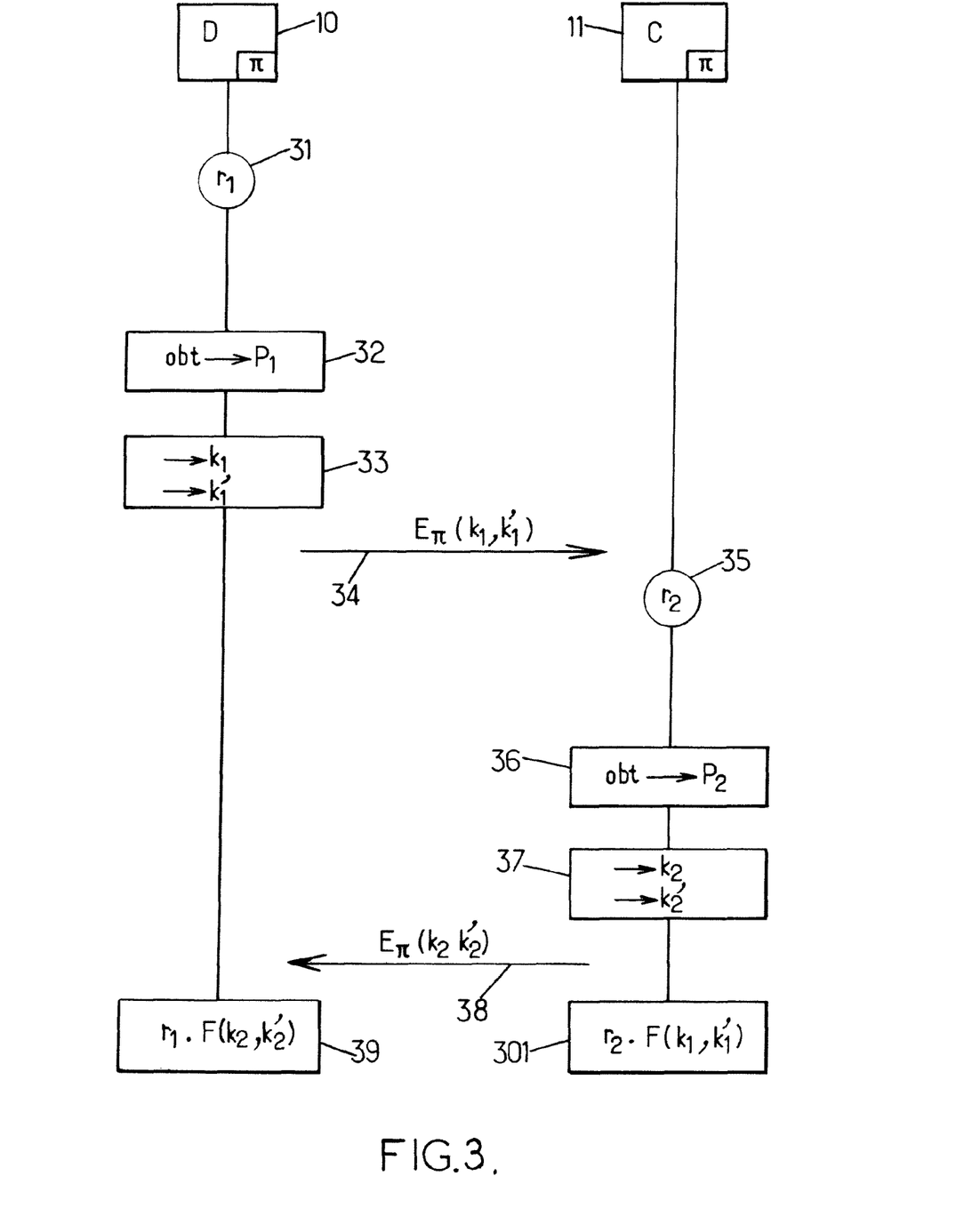
FIG. 3 illustrates an implementation of a method of control between a device and a controller according to one embodiment of the present invention.

FIG. 3 illustrates an exchange of messages between a device to be controlled 10 and a controller 11 according to one embodiment of the present invention.

The device to be controlled D 10 generates firstly at a step 31 a random value $r_1$. When the order of the set of points on the elliptical curve is an integer N, then $r_1$ can be taken at random by the set of values: [0, N−1].

Then, starting from this random value, a point P=(X,Y) on the elliptic curve $E_{a,b}$ is generated using a generator G. Said generator is such that, for any point P on the elliptic curve, there is a value h such that:

$$P=h \cdot G$$

Thus, a point $P_1$ is obtained such that:

$$P_1=r_1 \cdot G$$

Then, values of the parameters $k_1$ and $k_1'$ are determined, at a step 33, for representing the point $P_1$ according to parameters different from its coordinates X and Y, which, for their part, satisfy equation (2).

In order to determine these parameters $k_1$ and $k_1'$, firstly a random value can be generated for the parameter $k_1'$. Then, a point on the elliptic curve $P_{k1}$ corresponds to this random value $k_1'$, either by applying a function $f_{a,b}$ that makes coordinates x, y of a point on the curve correspond to a parameter, or by using a generator G of the points on the elliptic curve.

Then, a value of the parameter $k_1$ is obtained, by applying the inverse application of $f_{a,b}$ to the point corresponding to a subtraction in the group of points on the elliptic curve: P(X, Y)−$P_{k1}$.

The parameters $k_1$ and $k_1'$ represent the point P(X,Y). Next, the first and second parameters obtained previously are encrypted by an encryption function $E_\pi$ based on the password $\pi$, to transmit them to the controller via a message 34.

In a symmetrical fashion, the controller generates a random value $r_2$ at a step 35. Then it transforms this value into a point $P_2$ on the elliptic curve, at a step 36. Then, as described previously at step 33, the controller obtains respective values of the first and second parameters $k_2$ and $k_2'$, at a step 37. Then, it encrypts these values before transmitting them to the device to be controlled 10, via a message 38.

The device to be controlled 10 therefore has at its disposal the random value $r_1$, the values $k_2$ and $k_2'$ and the function F. Thus, at a step 39, it recovers the point $P_2$:

$$P_2=F(k_2,k_2')$$

It therefore obtains a secret key K shared with the controller but without having supplied any information about the password, which satisfies:

$$K=r_1 \cdot r_2 \cdot G$$

The controller recovers the secret key K in a symmetric fashion at a step 301.

The function F as defined above can be written in a different form. The following sections describe different representations of this point P which advantageously makes it possible not to supply redundancy of information during encrypted exchanges of the random values.

The function F is surjective of $F_q \times F_q'$ in $F_q$, such that:

$$P=F(k,k') \quad (3)$$

and such that, for any pair of values (k,k'), P is a point on the elliptic curve, without equation (1) being satisfied by k and k'.

In such a context, advantageously, no information can be deduced about the password, on the basis of exchanges of the random values exchanged, in contrast to the prior art. In fact, the pair of values (k,k') is then exchanged in encrypted fashion between the device and the controller. But, whatever the password tested by a potential attacker to recover this pair of values, it is impossible to determine whether this password is correct or not, since any result obtained corresponds to a point on the elliptic curve, without equation (1) being satisfied by k and k'.

Such a representation can be based on advantageous characteristics of a function $f_{a,b}(U)$ that has the following characteristic:

$$\forall P \in E_{a,b}, |f_{a,b}^{-1}(P)| < L$$

with L an integer.

In other words, the size of the pre-image set of this function is bounded by a small number L relative to the number of points on the elliptic curve.

By considering the following function $f_{a,b}(u)$, advantageously a function F can be determined according to one embodiment of the present invention, which makes a pair of parameters (x, u.x+v) in $F_q^2$ correspond to a parameter u in $F_q$, such that:

$$x = (v^2 - b - u^6/27)^{1/3} + u^2/3$$

and $$v = \frac{3a - u^4}{6u}$$

putting $$f_{a,b}(0) = 0.$$

The function F can then be written:

$$F(k,k')=f_{a,b}(k)+f_{a,b}(k')$$

or $$F(k,k')=f_{a,b}(k)+k' \cdot G$$

It can also be considered that $f_{a,b}$ is a function obtained from polynomials satisfying Skalba's equality:

$$f(X_1(k)) \cdot f(X_2(k)) \cdot f(X_3(k)) = U(k)^2$$

in which $X_1(k)$, $X_2(k)$, $X_3(k)$ and $U(k)$ are polynomials satisfying Skalba's equality, as defined for example in the document 'Rational points on certain hyperelliptic curves over finite fields' by Maciej Ulas, published 11 Jun. 2007. $F_{a,b}(k)$ is defined here as $(X_i(k), f(X_i(k))^{1/2})$ where i is such that $f(X_i(k))$ is a square in $F_q$.

Figure 4:
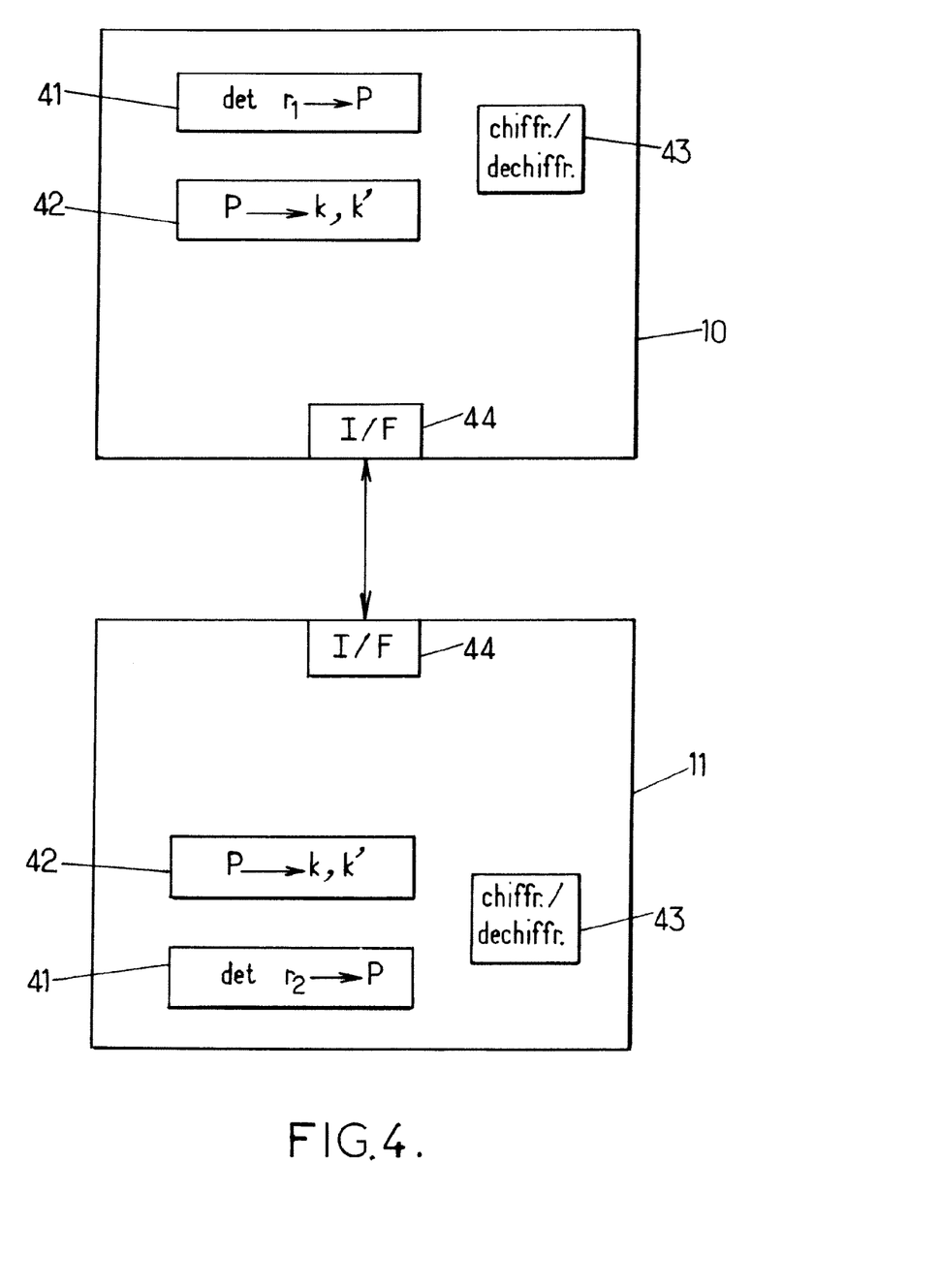
FIG. 4 illustrates a device and a controller according to one embodiment of the present invention.

FIG. 4 illustrates a control system comprising a device to be controlled and a controller according to one embodiment of the present invention.

Such a control system comprises at least one electronic entity as device to be controlled 10, and a control entity or controller 11 according to one embodiment of the present invention. Such an electronic entity, whether it is used as device to be controlled or as controller, can comprise:

- a determination unit 41 suitable for determining a point $P(X,Y)$ on an elliptic curve in a finite field $F_q$, q being an integer, on the basis of a random value $r_1$, the elliptic curve satisfying the equation:

$$E_{a,b}(x,y): x^3 + ax + b = y^2 \quad (1)$$

- an obtaining unit 42 suitable for obtaining first and second parameters k and k', such that $$P = F(k,k')$$

where F is a surjective function of $F_q \times F_{q'}$ in $F_q$,

- an encryption unit 43 suitable for obtaining first and second parameters in encrypted form by encryption as a function of the password; and
- an interface unit 44 suitable for transmitting said first and second encrypted parameters to the controller;

the function F being such that, whatever z and z' input elements of $F_q$, $F(z,z')$ is a point on the elliptic curve and the input elements do not satisfy equation (1).

The encryption function by password $E_\pi$ can be defined differently. It takes a bit string as input parameter and returns a bit string as output. Nevertheless it is necessary, to ensure password confidentiality, that the value returned does not give information about the password. Thus, two cases can be distinguished:

- either the password is used as encryption key of a classical encryption function,
- or the password is an index which, in a database, points to the value of the public parameters of the elliptic curve.

In both cases, the encryption algorithm can proceed as follows, for transforming a value of a parameter k or k' into a bit string, and the following method can be applied:

Select a random value r. Then transform a value v of a parameter into a bit string by calculating:

$$v' = v + r \cdot q'$$

with q' corresponding either to q or to N, q being the number of elements of the basic body $F_q$, N being the number of points on the elliptic curve. It is then possible to represent v' by a bit string.

In the case when the password $\pi$ is an index, v' is the encrypted value of v under the password, as only the person knowing the public parameters (q or N) can find the value of v.

In the case when the password is used as encryption key of a classical encryption function, it is sufficient to encrypt v' by using the encryption function $E_\pi$.

Thus, on the receiving side, in the first case, v can be recovered by calculating v' mod q'. In the second case, it is necessary to decipher the bit string sent by the decryption function, in order to find v' and finally be able to calculate v by calculating v' mod N.

The present invention can be applied advantageously in any type of cryptographic calculation using elliptic curves. It can in particular be advantageous in protocols for authentication by password, such as PACE (Password Authenticated Connection Establishment). In this case, it allows an improvement in calculation performance, while not allowing any attack linked with the execution time of the cryptographic calculation.

The present invention can also be applied advantageously in the context of privacy protocols, such as those used for checking electronic identity documents, such as electronic passports. In fact, listening in on the protocol presented does not make it possible to find the public parameters of the elliptic curve used, in contrast to the prior art.

The invention claimed is:

1. Method of control of a device by a controller on the basis of a password; said method comprising the following steps, at the device or at the controller:

/1/ determining on the basis of a random value $r_1$ a point $P(X,Y)$ on an elliptic curve, in a finite field $F_q$, q being an integer, of equation (1):

$$E_{a,b}(x,y): x^3 + ax + b = y^2$$

/2/ obtaining first and second parameters k and k', such that $$P(X,Y) = F(k,k')$$

where F is a surjective function of $F_q \times F_{q'}$, $F_q$,

/3/ encrypting the first and second parameters as a function of the password to obtain encrypted first and second parameters; and /4/ transmitting said encrypted first and second parameters to the controller;

in which the function F is such that, regardless of z and z' input elements of $F_q$, $F(z,z')$ is a point on the elliptic curve, and the input elements do not satisfy equation (1).

2. Method of control according to claim 1, in which the function F is written:

$$F(k,k') = f'(k') + f_{a,b}(k)$$

where $f_{a,b}$ is an invertible function, based on the coefficients a and b of the elliptic curve, taking an input parameter and supplying a point on the elliptic curve and where f' is a function generating a point on the elliptic curve as a function of a parameter; and in which, at step /2/, the parameters k and k' are obtained according to the following steps:
   - randomly generating a value of the parameter k';
   - calculating a value of f'(k');
   - determining a value of the parameter k according to the following equation:

$$k = f_{a,b}^{-1}(P(X,Y) - f'(k')).$$

3. Method of control according to claim 2, in which the function f' is written:

$$f'(k') = k' \cdot G$$

with G the generator of the set of points on the elliptic curve; and in which a value of the parameter k is determined according to the following equation:

$$k = f_{a,b}^{-}(P(X,Y) - k' \cdot G).$$

4. Method of control according to claim 2, in which the function f' is written:

$$f'(k')=f_{a,b}(k')$$

and in which a value of the parameter k is determined according to the following equation:

$$k=f_{a,b}^{-1}(P(X,Y)-f_{a,b}(k')).$$

5. Method of control according to claim 1, in which the function F comprises at least one invertible function $f_{a,b}$, obtained by means of polynomials $X_1(k)$, $X_2(k)$, $X_3(k)$ and $U(k)$ satisfying Skalba's equation:

$$f(X_1(k)) \cdot f(X_2(k)) \cdot f(X_3(k))=U(k)^2$$

where f is the polynomial that defines the elliptic curve $E_{a,b}$.

6. Method of control according to claim 5, in which the function $f_{a,b}$ makes a pair of parameters (x,y) in $F_q^2$ correspond to a parameter u in $F_q$, where q is equal to 2 mod 3, such that:

$$x = (v^2 - b - u^6/27)^{1/3} + u^2/3$$

and $$y = u \cdot x + v$$

with $$v = \frac{3a - u^4}{6u}$$

and $$f_{a,b}(0) = 0.$$

7. Method of control according to claim 1, further comprising the following steps:
  receiving a message indicating the first and second parameters in a form encrypted with the password;
  decrypting the first and second parameters and obtain parameters p and p'; and
  calculating a common secret value K with the controller according to the following equation:

$$K=r_1 \cdot F \cdot (p,p')$$

where $r_1$ is the random value used at step /1/.

8. Electronic entity in a system for control by password comprising:
  a determination unit configured to determine on the basis of a random value $r_1$ a point P(X,Y) on an elliptic curve in a finite field $F_q$, q being an integer, the elliptic curve being of equation (1):

$$E_{a,b}(x,y):x^3+ax+b=y^2$$

wherein first and second parameters k and k' are obtained such that $$P=F(k,k')$$

where F is a surjective function of $F_q \times F_{q'}$ in $F_q$,
  an encryption unit configured to encrypt the first and second parameters as a function of the password to obtain encrypted first and second parameters; and
  an interface unit configured to transmit said encrypted first and second parameters to the controller;
  the function F being such that, whatever z and z' input elements of $F_q$, F(z,z') is a point on the elliptic curve, and the input elements do not satisfy equation (1).

9. The electronic entity in the system of claim 8, wherein the electronic entity comprises a device controlled by a controller on the basis of the password.

10. The electronic entity in the system of claim 8, wherein the electronic entity comprises a controller operable to control a device on the basis of the password.

11. Electronic entity configured to implement a method of control which performs the following steps:
  /1/ determining on the basis of a random value $r_1$ a point P(X,Y) on an elliptic curve, in a finite field $F_q$, q being an integer, of equation (1):

$$E_{a,b}(x,y):x^3+ax+b=y^2$$

/2/ obtaining first and second parameters k and k', such that $$P(X,Y)=F(k,k')$$

where F is a surjective function of $F_q \times F_{q'}$ in $F_q$,
  /3/ encrypting the first and second parameters as a function of a password to obtain encrypted first and second parameters; and
  /4/ transmitting said encrypted first and second parameters;
  in which the function F is such that, regardless of z and z' input elements of $F_q$, F(z,z') is a point on the elliptic curve, and the input elements do not satisfy equation (1).

12. A system for control by password comprising:
  a first electronic entity configured as a controller; and
  a second electronic entity configured as a device to be controlled by the controller;
  wherein each of the first and second electronic entities comprises:
    a determination unit configured to determine on the basis of a random value $r_1$ a point P(X,Y) on an elliptic curve in a finite field $F_q$, q being an integer, the elliptic curve being of equation (1):

$$E_{a,b}(xy):ax+b=y^2$$

wherein first and second parameters k and k' are obtained such that $$P=F(k,k')$$

where F is a surjective function of $F_q \times F_{q'}$ in $F_q$,
    an encryption unit configured to encrypt the first and second parameters as a function of the password to obtain encrypted first and second parameters; and
    an interface unit configured to transmit said encrypted first and second parameters to the controller;
    the function F being such that, whatever z and z' input elements of $F_q$, F(z,z') is a point on the elliptic curve, and the input elements do not satisfy equation (1).

* * * * *